US007542126B2

(12) United States Patent
Hiruma

(10) Patent No.: US 7,542,126 B2
(45) Date of Patent: Jun. 2, 2009

(54) DROPLET EJECTION APPARATUS, METHOD FOR FORMING FUNCTIONAL FILM, APPARATUS FOR FORMING LIQUID CRYSTAL ALIGNMENT FILM, METHOD FOR FORMING LIQUID CRYSTAL ALIGNMENT FILM OF LIQUID CRYSTAL DISPLAY, AND LIQUID CRYSTAL DISPLAY

(75) Inventor: Kei Hiruma, Chino (JP)

(73) Assignee: Seiko Epson Corporation (JP)

( * ) Notice: Subject to any disclaimer, the term of this patent is extended or adjusted under 35 U.S.C. 154(b) by 300 days.

(21) Appl. No.: 11/705,376

(22) Filed: Feb. 12, 2007

(65) Prior Publication Data

US 2007/0188553 A1 Aug. 16, 2007

(30) Foreign Application Priority Data

Feb. 13, 2006 (JP) ............................. 2006-034782
Jan. 10, 2007 (JP) ............................. 2007-002315

(51) Int. Cl.
*G02F 1/13* (2006.01)
*G02F 1/1341* (2006.01)

(52) U.S. Cl. ....................................... 349/187; 349/189

(58) Field of Classification Search ................. 349/187, 349/189, 190, 123
See application file for complete search history.

(56) References Cited

U.S. PATENT DOCUMENTS 6,652,077 B2 11/2003 Maeng et al.
2004/0207800 A1 * 10/2004 Hiruma et al. .............. 349/189
2005/0007530 A1 1/2005 Hiruma

FOREIGN PATENT DOCUMENTS

JP 2005-221890 8/2005

* cited by examiner

*Primary Examiner*—David Nelms
*Assistant Examiner*—David Y Chung
(74) *Attorney, Agent, or Firm*—Harness, Dickey & Pierce, P.L.C.

(57) ABSTRACT

A droplet ejection apparatus for forming a functional film on a substrate is disclosed. The apparatus has a droplet ejection head having a nozzle forming surface in which a plurality of nozzles are formed. Droplets of a functional film forming composition are ejected from the nozzles onto the substrate. The nozzles form a plurality of nozzle rows that extend linearly. The nozzles of each of the nozzle rows are spaced at substantially equal intervals in such a manner that the pitch between each adjacent pair of the nozzles becomes greater than the diameter of a coating dot formed by each of the droplets on the substrate and smaller than the double of the diameter of each coating dot. The nozzle rows are arranged in such a manner as to form a zigzag pattern with the nozzles of the nozzle rows.

19 Claims, 7 Drawing Sheets

DROPLET EJECTION APPARATUS, METHOD FOR FORMING FUNCTIONAL FILM, APPARATUS FOR FORMING LIQUID CRYSTAL ALIGNMENT FILM, METHOD FOR FORMING LIQUID CRYSTAL ALIGNMENT FILM OF LIQUID CRYSTAL DISPLAY, AND LIQUID CRYSTAL DISPLAY

CROSS-REFERENCE TO RELATED APPLICATIONS

This application is based upon and claims the benefit of priority from prior Japanese Patent Application Nos. 2006-034782 filed on Feb. 13, 2006, and 2007-002315 filed on Jan. 10, 2007, the entire contents of which are incorporated herein by reference.

BACKGROUND

The present invention relates to a droplet ejection apparatus, a method for forming a functional film, an apparatus for forming a liquid crystal alignment film, a method for forming a liquid crystal alignment film of a liquid crystal display, and a liquid crystal display that are capable of efficiently forming a uniform functional film such as a liquid crystal alignment film on a substrate.

As a method for forming a functional film such as a liquid crystal alignment film of a liquid crystal display, a method using a droplet ejection apparatus is known. By this method, a functional film with a desired thickness is accurately formed at a desired position. The method is thus advantageous particularly as a method for forming a liquid crystal alignment film.

To form a liquid crystal alignment film, a plurality of coating dots are provided on a substrate by ejecting droplets of liquid composition for forming a liquid crystal alignment film on the substrate through a droplet ejection apparatus. The coating dots are then dried to form the liquid crystal alignment film. Typically, the composition for forming the liquid crystal alignment film is highly volatile. This may vary the time spent for drying the coating dots, causing unevenness on the liquid crystal alignment film, such as lines or drying marks. This makes it impossible to provide a uniform liquid crystal alignment film.

To solve this problem, an apparatus for forming an alignment film of JP-A-2005-221890 includes a plurality of nozzles that are spaced at intervals of 60 μm to 120 μm. Droplets are thus ejected onto a substrate in such a manner that each coating dot partly overlaps with adjacent coating dots.

However, a liquid crystal alignment film formed by the apparatus of JP-A-2005-221890 includes a relatively large area of overlapped portions between adjacent pairs of the coating dots. This increases the consumption amount of a composition for forming the liquid crystal alignment film, which raises the cost, and makes it difficult to form a film with extremely small thickness. Further, to form the overlapped portions between the adjacent pairs of the coating dots, the pitch between each adjacent pair of the nozzles is set to a relatively small value. This may vary the ejection amount among the nozzles due to mutual influence (cross-talking) between the adjacent nozzles, hampering formation of a uniform film. Also, the droplets may splash and clog some of the nozzles after having been ejected from the adjacent ones of the nozzles.

SUMMARY

Accordingly, it is an objective of the present invention to provide a droplet ejection apparatus, a method for forming a functional film, an apparatus for forming a liquid crystal alignment film, a method for forming a liquid crystal alignment film of a liquid crystal display, and a liquid crystal display that are capable of efficiently forming a uniform functional film at a low cost.

To achieve the foregoing objective and in accordance with a first aspect of the resent invention, a droplet ejection apparatus having a droplet ejection head having a nozzle forming surface in which a plurality of nozzles are formed is provided. Droplets of a functional film forming composition are ejected from the nozzles onto a substrate for forming a functional film on the substrate. The nozzles form a plurality of nozzle rows that extend linearly. The nozzles of each of the nozzle rows are spaced at substantially equal intervals in such a manner that the pitch between each adjacent pair of the nozzles becomes greater than the diameter of a coating dot formed by each of the droplets on the substrate and smaller than the double of the diameter of each coating dot. The nozzle rows are arranged in such a manner that the nozzles of the nozzle rows form a zigzag pattern.

To achieve the foregoing objective and in accordance with a second aspect of the present invention, a method for forming a functional film, in which the functional film is formed on a substrate by ejecting droplets of a functional film forming composition using the droplet ejection apparatus according to the above first aspect of the present invention, is provided.

To achieve the foregoing objective and in accordance with a third aspect of the present invention, a liquid crystal alignment film forming apparatus having a droplet ejection head having a nozzle forming surface in which a plurality of nozzles are formed is provided. Droplets of a liquid crystal alignment film forming composition are ejected from the nozzles onto a substrate for forming a liquid crystal alignment film on the substrate. The nozzles form a plurality of nozzle rows that extend linearly. The nozzles of each of the nozzle rows are spaced at substantially equal intervals in such a manner that the pitch between each adjacent pair of the nozzles becomes greater than the diameter of a coating dot formed by each of the droplets on the substrate and smaller than the double of the diameter of each coating dot. The nozzle rows are arranged in such a manner that the nozzles of the nozzle rows form a zigzag pattern.

To achieve the foregoing objective and in accordance with a fourth aspect of the present invention, a method for forming a liquid crystal alignment film of a liquid crystal display having a substrate including the liquid crystal alignment film is provided. The liquid crystal alignment film is formed on the substrate by ejecting droplets of a liquid crystal alignment film forming composition using the liquid crystal alignment film forming apparatus according to the above third aspect of the present invention.

To achieve the foregoing objective and in accordance with a fifth aspect of the present invention, a liquid crystal display having an opposed substrate, an element substrate, and a seal member is provided. The opposed substrate has a liquid crystal alignment film. The element substrate has a liquid crystal alignment film. The seal material bonds the opposed substrate and the element substrate together, a liquid crystal being sealed in a space defined by the seal material. The liquid crystal alignment film is formed on the opposed substrate or the element substrate using the liquid crystal alignment film forming apparatus according to the above third aspect of the present invention.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

Figure 1:
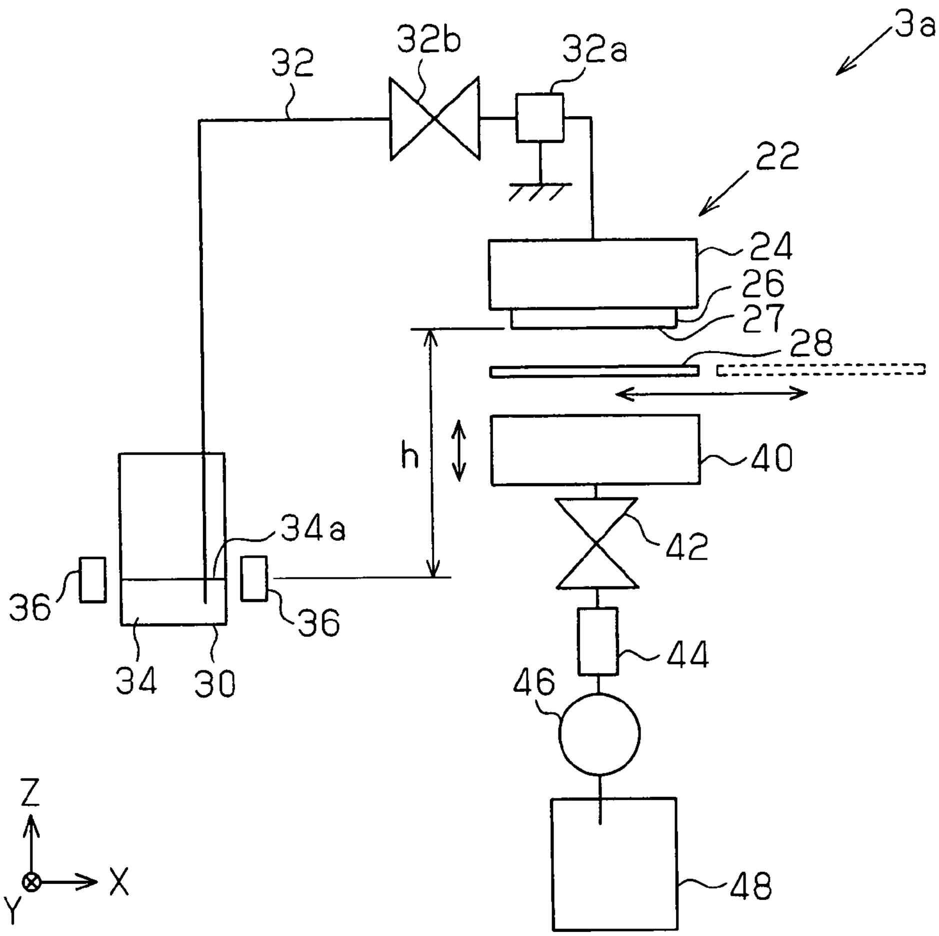
FIG. 1 is a view schematically showing an example of a droplet ejection apparatus of the present invention.

FIG. 1 schematically shows an example of a droplet ejection apparatus used in the present invention, or an inkjet type droplet ejection apparatus 3*a*.

As shown in FIG. 1, the droplet ejection apparatus 3*a* has a table 28 on which a substrate is mounted. The table 28 is movable in predetermined directions, such as directions X, Y, and Z. Through movement of the table 28 in direction X, the substrate, which has been placed on the table 28 by means of a belt conveyor or the like, is sent into the droplet ejection apparatus 3*a*.

The droplet ejection apparatus 3*a* has a droplet ejection head 22 through which an ejection material 34 is ejected onto the substrate. The droplet ejection head 22 has a head body 24 and a nozzle forming surface 26 in which a plurality of nozzles are defined for ejecting the ejection material 34. The ejection material 34, which is a functional film forming composition for forming a functional film on the substrate, is ejected from the nozzles of the nozzle forming surface 26.

A tank 30 is connected to the droplet ejection head 22 through an ejection material transport pipe 32. The tank 30 retains the ejection material 34 (the functional film forming composition). The ejection material 34 is transported through the ejection material transport pipe 32.

To prevent charging in the ejection material transport pipe 32, the ejection material transport pipe 32 includes an ejection material line ground coupling 32*a* and a head bubble removal valve 32*b*. As will be described later, the head bubble removal valve 32*b* is used when the ejection material 34 is drawn from inside the droplet ejection head 22.

The tank 30 includes a liquid-level control sensor 36 that regulates the amount of the ejection material 34 in the tank 30, or, in other words, the height of a liquid level 34*a* of the functional film forming material in the tank 30. Specifically, the liquid level control sensor 36 operates to maintain the difference h (hereinafter, referred to as a liquid head value) between the height of a distal portion 27 of the nozzle forming surface 26 of the droplet ejection head 22 and the height of the liquid level 34*a* in the tank 30 in a predetermined range. By regulating the height of the liquid level 34*a*, the ejection material 34 in the tank 30 is supplied to the droplet ejection head 22 under pressure in a predetermined range. In this manner, the ejection material 34 is stably ejected from the droplet ejection head 22.

A suction cap 40 is provided at a position opposed to the nozzle forming surface 26 of the droplet ejection head 22 and spaced from the nozzle forming surface 26 at a certain distance. The suction cap 40 is movable in direction Z of FIG. 1. Specifically, the suction cap 40 tightly contacts the nozzle forming surface 26 in such a manner as to surround the nozzles defined in the nozzle forming surface 26. The suction cap 40 thus defines a sealed space with respect to the nozzle forming surface 26 and prevents the nozzles from being exposed to the outside air.

A passage is provided below the suction cap 40 and includes a suction valve 42, a suction pressure sensor 44, and a suction pump 46 formed by, for example, a tube pump. The suction pressure sensor 44 detects abnormal suction. To draw the ejection material 34 from the droplet ejection head 22 by the suction pump 46 through the suction cap 40, the head bubble removal valve 32*b* is held in a closed state. This blocks flow of the ejection material 34 out of the tank 30. In this state, the suction pump 46 is actuated to increase the flow rate of the ejection material 34 that is being drawn. This discharges the bubbles from the droplet ejection head 22. After having been drawn by the suction pump 46 or the like, the ejection material 34 is retained in a waste liquid tank 48.

Suction of the ejection material 34 from the nozzles by the suction cap 40 is performed when the droplet ejection head 22 is not ejecting the ejection material 34, for example, when the droplet ejection head 22 stands by at a retreat position and the table 28 is located at the position indicated by the broken line of FIG. 1.

The nozzles formed in the nozzle forming surface 26 of the droplet ejection head 22 form a plurality of nozzle rows. In each of the nozzle rows, the pitch of each adjacent pair of the nozzles is greater than the diameter of each coating dot, which is formed by a droplet ejected onto the substrate, and smaller than the double of the coating dot diameter.

The “coating dot” refers to a coating film eventually formed on the substrate by a single droplet of the functional film forming composition that has been ejected onto the substrate through a single nozzle and dries while spreading on the substrate. Normally, the ejected droplet spreads evenly on the substrate so that the coating dot forms a circular shape. The coating dot diameter refers to the diameter of the coating dot (the length of the major axis, if the coating dot forms an oval shape). The “pitch of the nozzles” refers to the distance from the center of one of the nozzles to the center of an adjacent one of the nozzles.

The nozzle rows are aligned in such a manner that the nozzles are arranged in a zigzag pattern. Although two to five nozzle rows are normally provided, it is preferable to arrange two nozzle rows to facilitate operation of the droplet ejection apparatus 3*a*.

Figure 2A:
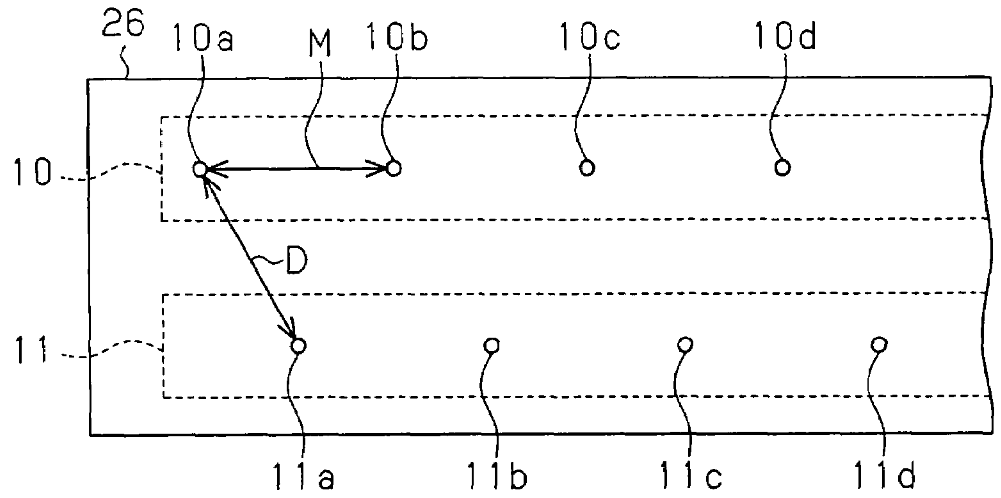
FIG. 2A is a view for explaining an arrangement of the nozzles of the droplet ejection apparatus.

An example of nozzle arrangement of the present invention is illustrated in FIG. 2A (showing a portion of the arrangement). In FIG. 2A, two nozzle rows are provided. The nozzle pitch is determined in a range represented by the following formula (1), and, preferably, the formula (2). In the formulas, L refers to the coating dot diameter and M refers to the nozzle pitch.

$$L<M<2L \quad (1)$$

$$1.2L<M<1.7L \quad (2)$$

If the nozzle pitch (M) is excessively great, non-coated portions may be caused on the substrate. If the nozzle pitch (M) is excessively small, each adjacent pair of the nozzles influence each other, thus varying the ejection amounts of the nozzles. This may make it impossible to form a uniform film, or cause splashing of the droplet from some of the nozzles, which clogs the adjacent ones of the nozzles.

Specifically, although the coating dot diameter (L) varies depending on the type of the functional film forming composition, the coating dot diameter (L) is normally 50 μm to 200 μm, and preferably 100 μm to 120 μm. The nozzle pitch (M) is normally 100 μm to 240 μm, and preferably 120 μm to 160 μm.

Referring to FIG. 2A, nozzles 10*a*, 10*b*, 10*c*, 10*d* form a first row of nozzles (hereinafter, referred to as a "first nozzle row 10"). Nozzles 11*a*, 11*b*, 11*c*, 11*d* form a second row of nozzles (hereinafter, referred to as a "second nozzle row 11"). The first and second nozzle rows 10, 11 are aligned in such a manner that the nozzles 10*a*, 10*b*, 10*c*, 10*d* and the nozzles 11*a*, 11*b*, 11*c*, 11*d* are arranged in a zigzag pattern.

The number of the nozzles forming each of the nozzle rows 10, 11 is not limited to a particular value but may be determined as necessary in correspondence with the size of the substrate, or the use of the functional film to be formed. However, each nozzle row includes 5 to 500 nozzles normally, 50 to 300 nozzles preferably, and, more preferably, 100 to 200 nozzles.

Although the interval between the first nozzle row 10 and the second nozzle row 11 is not limited to a specific value, such interval is preferably a distance that prevents mutual influences between the nozzles of the first and second nozzle rows 10, 11. If the interval between the first nozzle row 10 and the second nozzle row 11 is excessively great, drying marks are disadvantageously formed on the coating dots, which will be explained later. The nozzle interval D between the first nozzle row 10 and the second nozzle row 11 (for example, the distance between the nozzle 10*a* and the nozzle 11*a* or the nozzle 10*b* and the nozzle 11*b*) is determined from a range represented by the following formula (3), and preferably the formula (4).

$$L<D<2L \quad (3)$$

$$1.2L<D<1.7L \quad (4)$$

Normally, the droplets are ejected simultaneously from all of the nozzles defined in the droplet ejection head 22. After having been received by the substrate, the droplets dry on the substrate while spreading on the substrate. This forms the coating dots on the substrate.

In the droplet ejection apparatus 3*a* of the present invention, the nozzle pitch (M) is set to a value greater than the coating dot diameter (L). This causes a gap between each adjacent pair of the coating dots. Since the nozzle pitch (M) is smaller than the double of the coating dot diameter (L), the gap between each adjacent pair of the coating dots is smaller than the coating dot diameter (L). As will be later discussed, the gaps between the coating dots can be filled in an optimal state by providing the coating dots in the gaps.

Figure 2B:
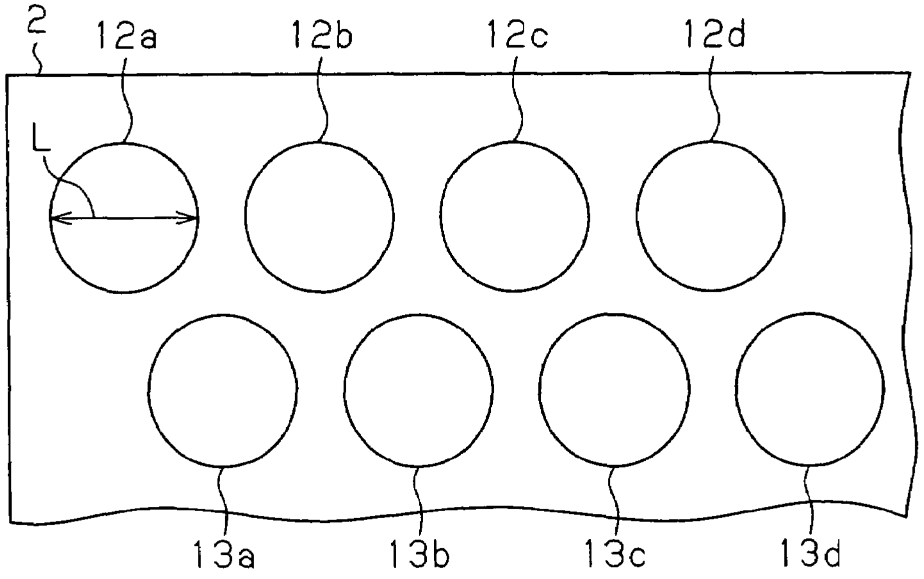
FIG. 2B is a view for explaining coating dots formed by the droplet ejection apparatus.
Figure 3:
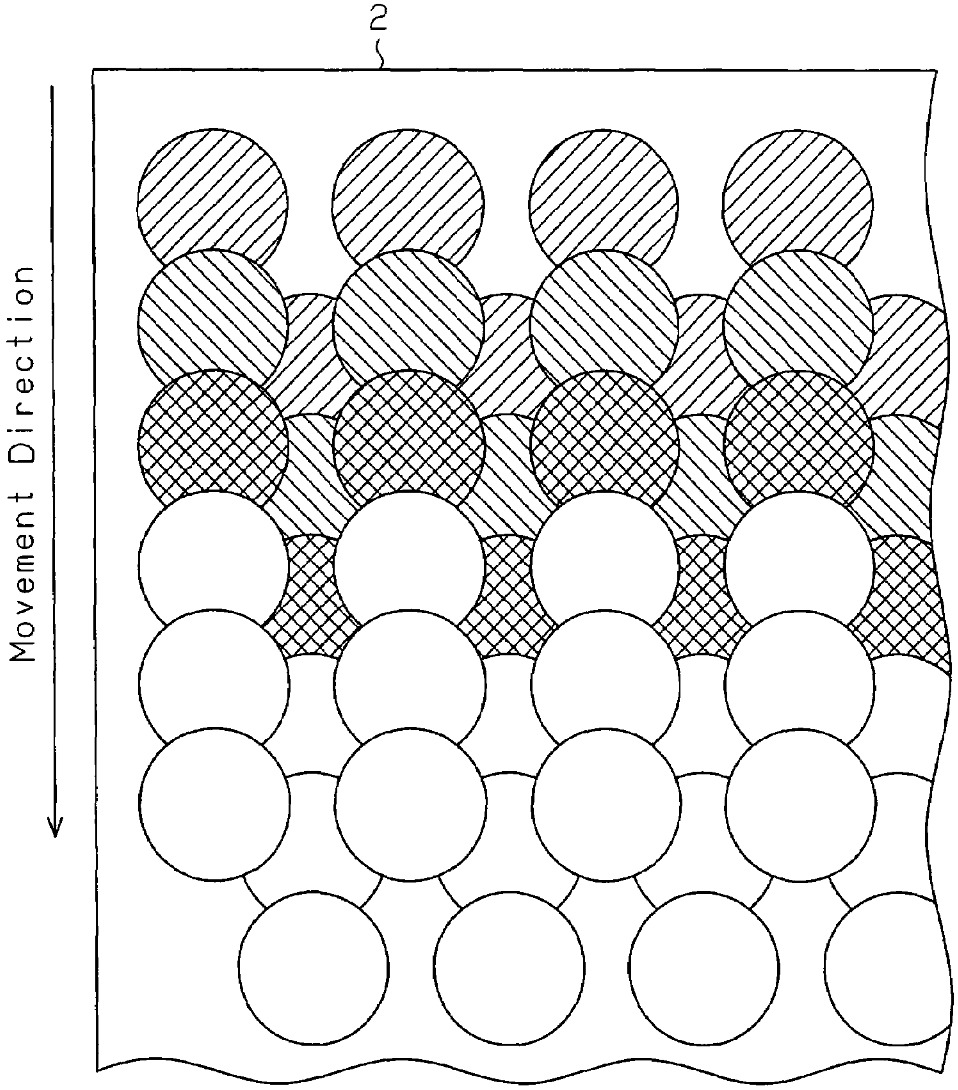
FIG. 3 is a view for explaining formation of the coating dots using the example of the droplet ejection apparatus.
Figure 3:
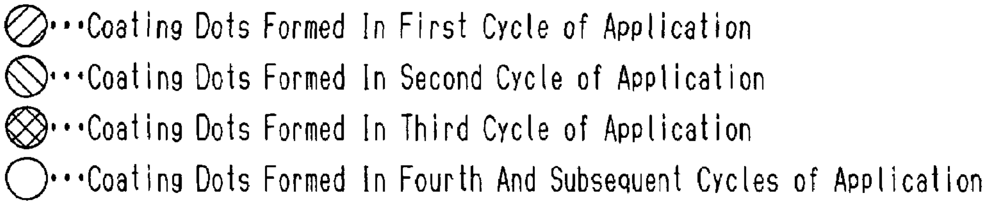

FIGS. 2B and 3 each show the coating dots formed by the ejected droplets. In the drawings, the reference numeral 2 refers to the substrate.

FIG. 2B is a view schematically showing the coating dots provided through a single ejection cycle as viewed from above the substrate 2. Coating dots 12*a*, 12*b*, 12*c*, 12*d* are formed by droplets ejected from the nozzles 10*a*, 10*b*, 10*c*, 10*d*, respectively, of the first nozzle row 10. Coating dots 13*a*, 13*b*, 13*c*, 13*d* are formed by droplets ejected from the nozzles 11*a*, 11*b*, 11*c*, 11*d*, respectively, of the second nozzle row 11.

FIG. 3 is a view schematically showing the coating dots formed by repeating ejection as viewed from above the substrate 2. After a first cycle of ejection, one of the substrate 2 and the droplet ejection head 22 is adjusted to an ejecting position of the other. Then, through linear movement (scanning) in a movement direction (a scanning direction), droplets are ejected from the first and second nozzle rows 10, 11 onto predetermined positions at predetermined timings.

Referring to FIG. 3, in such second cycle of ejection, corresponding coating dots are formed on the substrate 2 in such a manner as to partially overlap with the coating dots provided in the first cycle of ejection. Subsequently, the substrate 2 or the droplet ejection head 22 is linearly moved again to the ejecting position. The first and second nozzle rows 10, 11 are then operated to eject droplets onto predetermined positions at predetermined timings (a third cycle of ejection). As illustrated in FIG. 3, in such third cycle of ejection, corresponding coating dots are formed on the substrate 2 in such a manner as to partially overlap with the coating dots provided in the second cycle of ejection.

By repeating such ejection of droplets in the fourth and subsequent cycles of ejection, overlapped portions of the coating dots are provided, with reference to FIG. 3. In this manner, the functional film forming composition, which forms the droplets, is optimally and efficiently applied onto the substrate 2, forming a functional film on the substrate 2.

The overlapping margin between each adjacent pair of the coating dots is determined depending on the type and the thickness of a functional film to be formed. To save the cost, it is preferred that the overlapping margin be reduced to a value in a range that prevents formation of non-coated portions, in which the functional film forming composition is not provided. The overlapping margin of the coating dots is adjusted in correspondence with the nozzle pitch (M), the movement speed of the substrate 2 or the droplet ejection head 22, the ejection amount of a droplet per ejection cycle, and the timings of ejection of droplets.

The droplet ejection apparatus 3*a* of the present invention reduces the area of the overlapped portions of the functional film forming composition. Therefore, a film with extremely small thickness can be formed efficiently. The droplet ejection apparatus 3*a* is suitable particularly for formation of a functional film with the extremely small thickness of 10 μm to 100 μm.

By reducing the area of the overlapped portions, the consumption amount of the functional film forming composition decreases, thus saving the cost.

In a longitudinal direction (the movement direction as viewed in FIG. 3) and a lateral direction (a direction perpendicular to the movement direction as viewed in the drawing), any one of the coating dots is formed with a short delay with respect to an adjacent one of the coating dots. This prevents formation of drying marks in the boundary between the adjacent ones of the coating dots due to variation of the time spent for drying the coating dots. A uniform functional film is thus provided on the entire surface of the substrate 2 without causing drying marks or formation of lines.

In the droplet ejection apparatus 3*a* of the present invention, it is preferred that, when ejection of droplets is performed, the substrate 2 or the droplet ejection head 22 be moved in a direction perpendicular to the extending direction of each nozzle row 10, 11.

In the droplet ejection apparatus 3*a* of the present invention, it is preferred that the length of each nozzle row defined in the droplet ejection head 22 be set to a value equal to the width of the area of the substrate 2 in which the functional film is to be formed (a functional film forming area) and that the functional film forming composition is applied from the nozzle rows 10, 11 simultaneously onto the entire width of the functional film forming area on the substrate 2. In this case, application of the functional film forming composition onto the entire surface of the substrate 2 is completed by repeating droplet ejection through a single cycle of transportation of the substrate 2 or the droplet ejection head 22 in a single direction, thus improving efficiency. This also prevents formation of drying marks and lines due to variation of the time spent for drying the droplets. A functional film with uniform thickness is thus formed on the entire surface of the substrate 2.

It is preferred that the surface tension of the functional film forming composition ejected by the droplet ejection apparatus 3*a* of the present invention be 30 mN/m to 45 mN/m (at 20° C.). If the surface tension of the functional film forming composition falls in this range, the functional film forming composition exhibits an improved wettability. This allows the droplet ejection apparatus 3*a* to efficiently form a coating film with uniform thickness.

It is preferred that the functional film forming composition ejected by the droplet ejection apparatus 3*a* of the present invention exhibit viscosity of 3 mPa·s to 20 mPa·s at 20° C.. Such functional film forming composition has an improved flowability. This stabilizes ejection performance of the droplet ejection apparatus 3*a*.

As long as the functional film forming composition, which is ejected by the droplet ejection apparatus 3*a* of the present invention, is capable of forming a coating film on the substrate 2 and the coating film is functional in any suitable manner, any suitable functional film forming composition may be employed. The functional film forming composition may be, for example, a liquid crystal alignment film forming composition, an overcoat film forming composition, a color filter film forming composition, or a photoresist film forming composition.

Next, a method for forming a functional film, or a liquid crystal alignment film, by way of example, according to the present invention will be explained.

Figure 4:
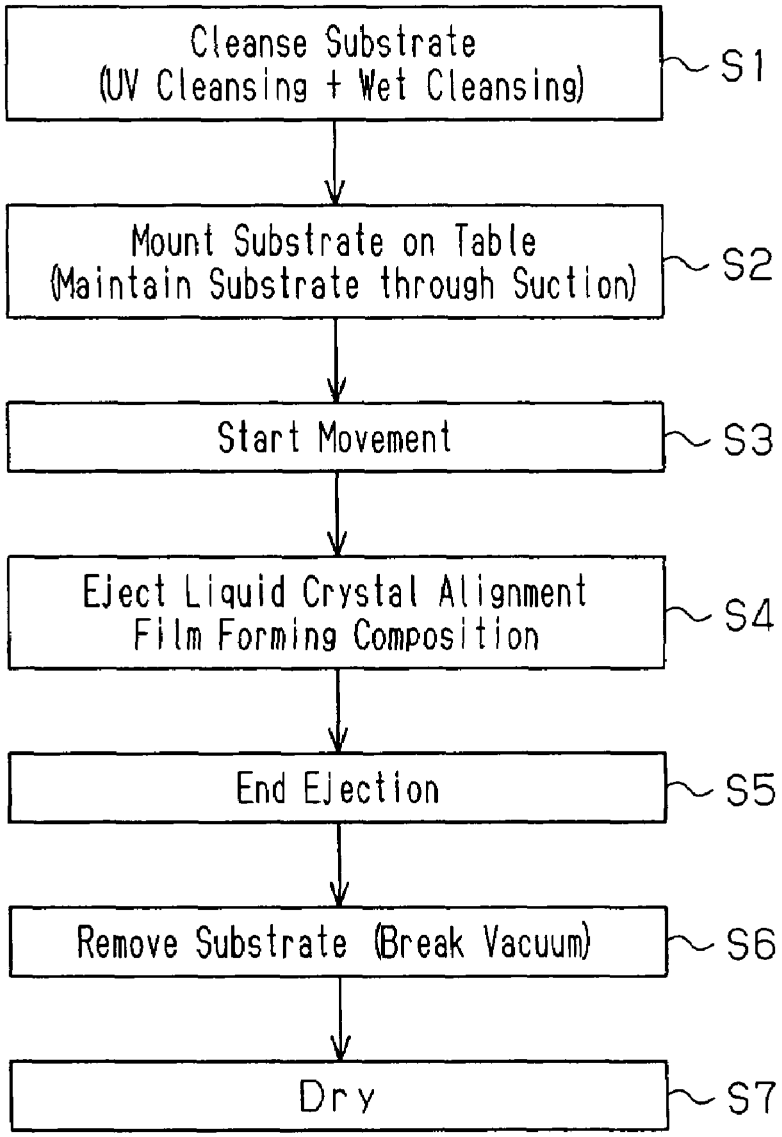
FIG. 4 is a flowchart representing a method for forming a liquid crystal alignment film.

The flowchart of FIG. 4 represents a procedure of the method for forming the liquid crystal alignment film according to the present invention. The procedure will be described with reference to the flowchart.

First, a substrate on which a liquid crystal alignment film is to be formed is prepared. As the substrate, a transparent substrate formed of, for example, glass such as float glass, soda glass, or plastics such as polyethylene terephthalate, polybutylene terephthalate, polyether sulfone, or polycarbonate may be used. A transparent conductive film deposited on a surface of the substrate may be an NESA film (trade name of PPG Industries of the United States of America) formed of tin oxide ($SnO_2$) or an ITO film formed of indium oxide-tin oxide ($In_2O_3$—$SnO_2$). These transparent conductive films are subjected to patterning by a photo etching method or a method employing a mask in advance.

In step S1, UV (172 nm) cleansing is performed on the substrate 2. The substrate 2 is then cleansed in purified water or alcohol.

In step S2, the substrate 2 is mounted on the table 28 and held by the table 28 through vacuum suction.

In step S3, when the liquid film forming composition is ready for ejection, the substrate 2 is moved in a direction perpendicular to the extending direction of each nozzle row 10, 11 by means of the table 28 of the droplet ejection apparatus 3*a* of the present invention.

In step S4, synchronously with movement of the substrate 2 in step S3, droplets are ejected from the droplet ejection head 22 (the distal portion 27) onto the substrate 2.

The ejection amount of each droplet is adjusted in such a manner that the coating dot diameter (L) and the nozzle pitch (M) satisfy the relationship represented by the formula (1).

The timing of droplet ejection and the movement speed of the table 28 are adjusted in such a manner that an overlapped portion is formed in a desired manner between each adjacent pair of the coating dots in the movement direction of the table 28. To decrease the thickness of the film, the movement speed of the table 28 is adjusted to increase the interval between each adjacent pair of the coating dots.

Depending on the condition of a stepped portion formed by wiring or the condition of a surface of a metal film provided on the substrate 2, the flowability of the droplets of the liquid crystal film forming composition, which diffuse on the substrate 2, may vary. In this case, the ejection amount of each droplet or the movement speed of the table 28 is changed in correspondence with the type of the substrate 2.

In step S5, after application of the liquid crystal film forming composition, the movement of the substrate 2 by the table 28 is ended.

In step S6, the substrate 2 on which a film has been formed is removed from the table 28.

In step S7, the substrate 2 is mounted in a heater portion (60 to 80° C.) and dried.

In this manner, a liquid crystal alignment film forming substrate, or the substrate 2 having a liquid crystal alignment film deposited on the surface of the substrate 2, is obtained.

The thickness of the obtained liquid crystal alignment film is normally 1 nm to 1000 nm, and preferably 10 nm to 100 nm.

By the method for forming the functional film of the present invention, a uniform liquid crystal alignment film with extremely small thickness can be efficiently provided on the substrate 2 at a low cost.

Since a functional film with extremely small thickness is easily formed by the above-described method of the present invention, the method is suitable particularly for formation of a liquid crystal alignment film, which is required to be thin and uniform.

The functional film obtained by this method is not restricted to the liquid crystal alignment film. However, other types of functional films can be formed in similar manners using the method of the present invention. The functional films include, for example, a liquid crystal alignment film, an overcoat film, a color filter film, and a photoresist film.

Using the liquid crystal alignment film forming substrate provided by the method of the present invention, a high-quality liquid crystal display is manufactured at a low cost.

An alignment film forming apparatus formed by the above-described droplet ejection apparatus that forms the liquid crystal alignment film on the liquid crystal alignment film forming substrate of the liquid crystal display will hereafter be explained.

Figure 5:
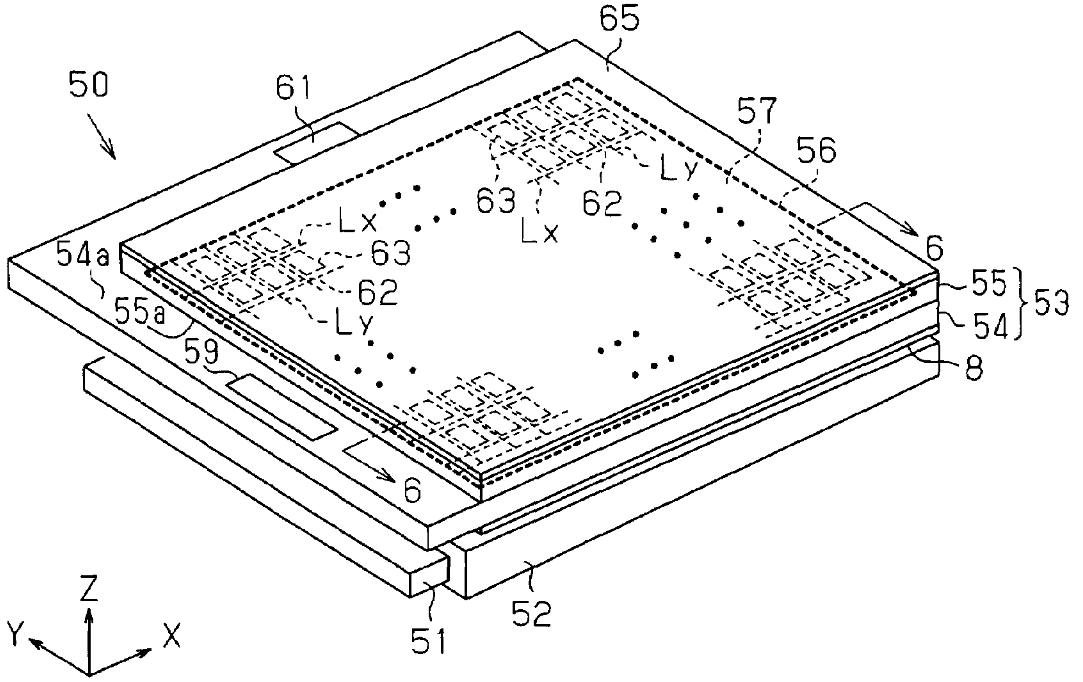
FIG. 5 is a perspective view showing a liquid crystal display.

FIG. 5 is a perspective view showing a liquid crystal display 50. An edge light type backlight 52, which is shaped like a rectangular plate and has a light source 51 such as an LED, is arranged in a lower portion of the liquid crystal display 50. A liquid crystal panel 53, which is shaped like a rectangular plate and sized substantially equal to the size of the backlight 52, is provided above the backlight 52. The light emitted by the light source 51 is radiated onto the liquid crystal panel 53.

Figure 6:
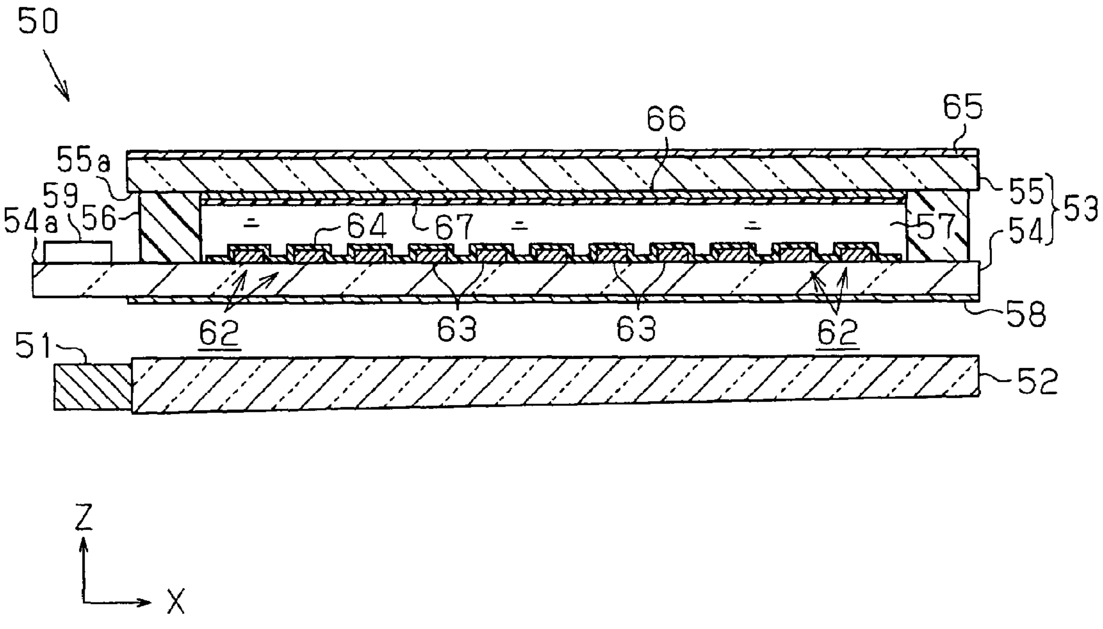
FIG. 6 is a cross-sectional view taken along line 6-6 of FIG. 5, showing the liquid crystal display.

The liquid crystal panel 53 has an element substrate 54 and an opposed substrate 55 opposed to the element substrate 54. As illustrated in FIG. 6, the element substrate 54 and the opposed substrate 55 are bonded together through a seal material 56 having a rectangular frame-like shape and formed of light curing resin. Liquid crystal 57 is sealed in the space between the element substrate 54 and the opposed substrate 55.

An optical substrate 58, such as a polarizing plate or a phase plate, is bonded with the lower surface (the surface facing the backlight 52) of the element substrate 54. The optical substrate 58 linearly polarizes the light of the backlight 52 and emits the light onto the liquid crystal 57. A plurality of scanning lines Lx are formed on the upper surface (the surface facing the opposed substrate 55), or an element forming surface 54*a*, of the element substrate 54. The scanning lines Lx extend substantially along the entire width of the element forming surface 54*a* in one direction, or direction X. Each of the scanning lines Lx is electrically connected to a scanning line driver circuit 59 provided in a side portion of the element substrate 54. A scanning signal generated by the scanning line driver circuit 59 is input to a corresponding one of the scanning lines Lx at a predetermined timing. A plurality of data lines Ly are also arranged on the element forming surface 54*a*. The data lines Ly extend substantially along the entire length of the element forming surface 54*a* in direction Y. Each of the data lines Ly is electrically connected to a data line driver circuit 61 formed in a different side portion of the element substrate 54. The data line driver circuit 61 inputs a data signal generated in accordance with display data to a corresponding one of the data lines Ly at a predetermined timing.

Pixels 62 are formed on the element forming surface 54*a* at intersections of the scanning lines Lx and the data lines Ly. In other words, a plurality of pixels 62 are arranged to form a matrix on the element forming surface 54*a*. A non-illustrated control element such as a TFT or a pixel electrode 63 with optical transparency formed by, for example, a transparent conductive film is provided in each of the pixels 62.

Referring to FIG. 6, a liquid crystal alignment film 64, which has been subjected to an alignment process through, for example, rubbing, is deposited on the pixels 62. The liquid crystal alignment film 64 is a thin film formed of alignment polymer and sets orientation of the liquid crystals 57 on the pixel electrodes 63 in a predetermined manner. The liquid crystal alignment film 64 is formed by an inkjet method. Specifically, a solution (liquid crystal alignment film forming compositions F) prepared by dissolving liquid crystal alignment film forming material such as polyimide in a prescribed solvent is ejected onto each of the pixels 62 as a droplet Fb (see FIG. 9). The droplets Fb are then dried to form the liquid crystal alignment film 64.

A polarizing plate 65 is provided on the opposed substrate 55 and sends linear-polarized light proceeding perpendicularly to the light that has transmitted through the optical substrate 58 in an outward direction (an upward direction as viewed in FIG. 6). An opposed electrode 66 is arranged on the entire portion of the lower surface (the surface facing the element substrate 54), or an electrode forming surface 55*a*, of the opposed substrate 55. The opposed electrode 66 is formed by an optically transparent conductive film opposed to the pixel electrodes 63. The opposed electrode 66 is electrically connected to the data line driver circuit 61 and receives a predetermined common potential from the data line driver circuit 61. A liquid crystal alignment film 67, which has been subjected to an alignment procedure through, for example, rubbing, is arranged on the entire portion of the lower surface of the opposed electrode 66. Like the liquid crystal alignment film 64, the liquid crystal alignment film 67 is formed by an inkjet method. The liquid crystal alignment film 67 sets the orientation of the liquid crystal 57 in a prescribed manner in the vicinity of the opposed electrode 66.

In accordance with line progressive scanning, the scanning lines Lx are selected one by one at predetermined timings. The control element of the corresponding one of the pixels 62 is thus turned on for the period in which the scanning line Lx is selected. Respondingly, a data signal, which is generated in accordance with the display data, is input to the pixel electrode 63 corresponding to the control element through the corresponding one of the data lines Ly. This changes the difference between the potential of the pixel electrode 63 and the potential of the opposed electrode 66 in correspondence with the data signal. The oriented state of the liquid crystal 57 between the pixel electrode 63 and the opposed electrode 66 is thus altered. In other words, the polarized state of the light exiting the optical substrate 58 varies for the respective pixels 62 in correspondence with the data signals. Therefore, transmission of the light through the polarizing plate 65 is selectively permitted and prohibited for the respective pixels 62. In this manner, an image appears on the upper side of the liquid crystal panel 53 in accordance with the display data.

An alignment film forming apparatus, which is formed by a droplet ejection apparatus 70 for providing the liquid crystal alignment film 67 (the liquid crystal alignment film 64), will be explained in the following with reference to FIGS. 7 to 9.

Figure 7:
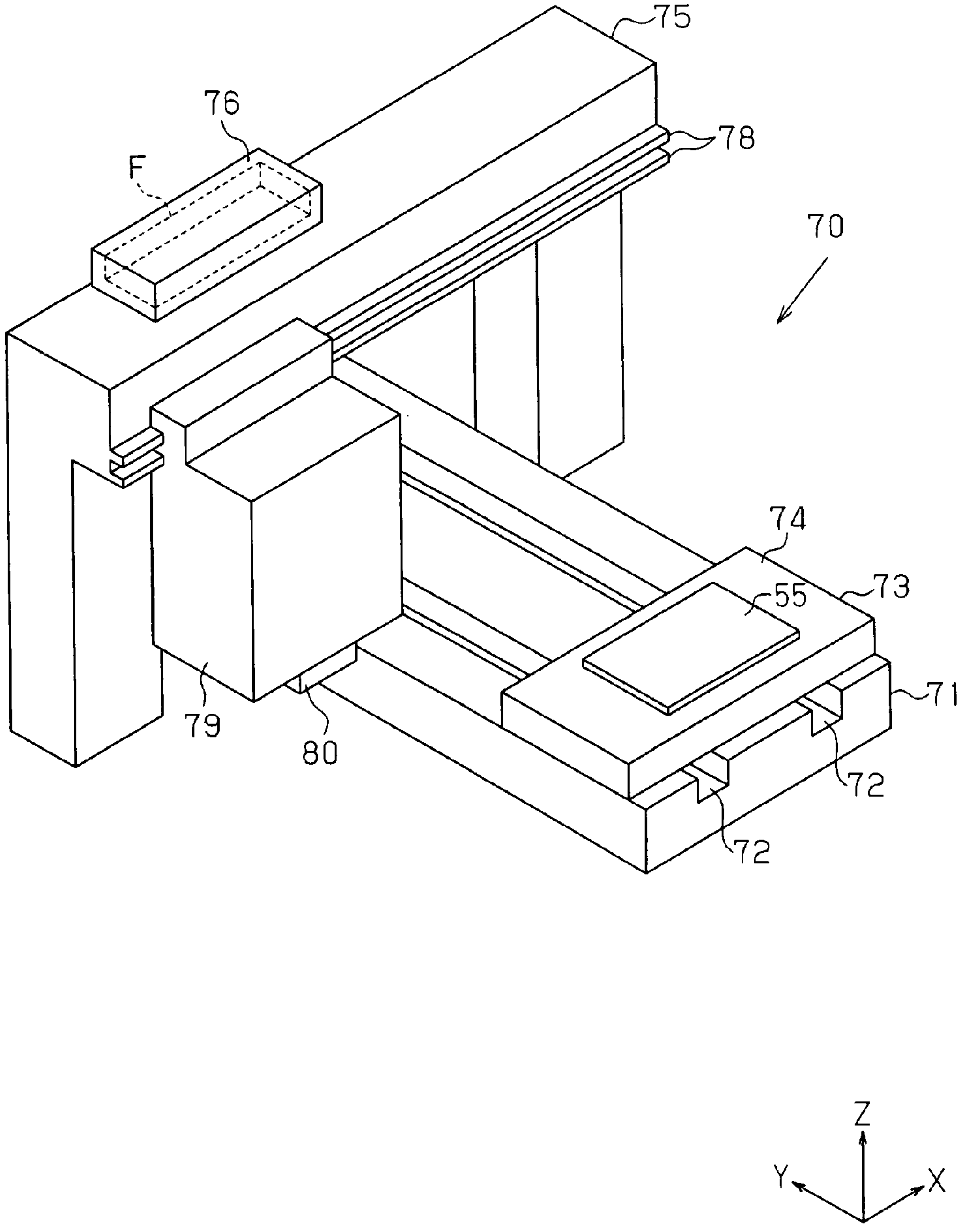
FIG. 7 is a perspective view showing the droplet ejection apparatus.

FIG. 7 is a perspective view showing the droplet ejection apparatus 70 as a whole. The droplet ejection apparatus 70 is an apparatus by which an alignment film is formed. The droplet ejection apparatus 70 has a base 71 having a rectangular parallelepiped shape. A pair of guide grooves 72 are defined in the upper surface of the base 71 and extend in the longitudinal direction (direction Y) of the base 71. A stage 73 is provided on the upper surface of the base 71 and moves along the guide grooves 72 in a main scanning direction (a direction parallel with direction Y). The upper surface of the stage 73 forms a mounting surface 74 on which the opposed substrate 55 can be mounted. The mounting surface 74 positions and fixes the opposed substrate 55, which is mounted on the mounting surface 74 with the opposed electrode 66 facing upward, with respect to the stage 73. Although the opposed substrate 55 is mounted on the mounting surface 74 with the opposed electrode 66 facing upward in the illustrated embodiment, the element substrate 54 may be mounted on the mounting surface 74 with the pixel electrodes 63 facing upward.

The droplet ejection apparatus 70 has a gate-shaped guide member 75, which is provided in a state straddling the base 71 in a sub-scanning direction (a direction parallel with direction X) perpendicular to the main scanning direction. A tank 76 extending in direction X is provided on the upper surface of the guide member 75 and retains the liquid crystal alignment film forming composition F.

A supply tube T (see FIG. 9) is connected to the tank 76. The liquid crystal alignment film forming composition F is supplied to a droplet ejection head (hereinafter, referred to as an ejection head) 80 through the supply tube T under a predetermined pressure. The liquid crystal alignment film forming composition F is then ejected from the ejection head 80 onto the opposed substrate 55, which is mounted on the mounting surface 74, as droplets Fb.

A pair of upper and lower guide rails 78 are formed in the guide member 75, extending substantially along the entire length of the guide member 75 in direction X. A carriage 79 is secured to the guide rails 78 and moved in direction X while being guided by the guide rails 78. The ejection head 80, which is an ejecting member, is mounted in the carriage 79.

Figure 8:
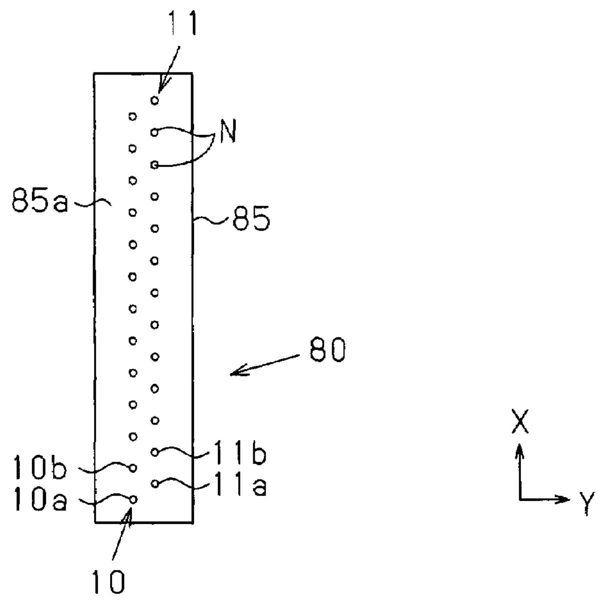
FIG. 8 is a bottom view showing en ejection head.

FIG. 8 is a view showing the ejection head 80 as viewed from the side corresponding to the stage 73 (a lower side in the droplet ejection apparatus 70). A nozzle plate 85 of the ejection head 80 has the above-described first nozzle row 10 and second nozzle row 11. The first and second nozzle rows 10, 11 include the corresponding nozzles N (10*a*, 10*b* . . . , 11*a*, 11*b*. . . ), which are provided under the aforementioned conditions illustrated in FIG. 2A.

Figure 9:
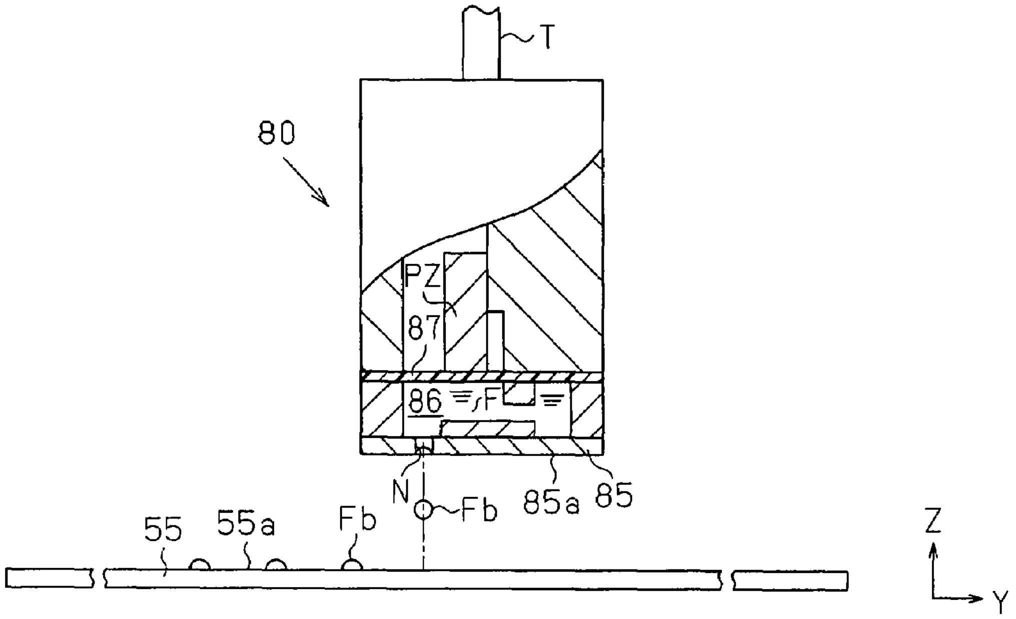
FIG. 9 is a partially cutaway side view showing the ejection head.

FIG. 9 is a cross-sectional view showing a main portion of the ejection head 80 for explaining the configuration of the interior of the ejection head 80.

With reference to FIG. 9, the supply tube T is connected to the upper side of the ejection head 80. The liquid crystal alignment film forming composition F is supplied from the tank 76 to the ejection head 80 through the supply tube T. The ejection head 80 includes cavities 86 that communicate with the supply tube T. Each of the cavities 86 retains the liquid crystal alignment film forming composition F, which has been provided through the supply tube T, and supplies the liquid crystal alignment film forming composition F to the corresponding one of the nozzles N. An oscillation plate 87 is arranged above each cavity 86 and vertically oscillates to increase and decrease the volume of the cavity 86. Piezoelectric elements PZ are arranged on the oscillation plates 87 in correspondence with the nozzles N. By contracting and extending in a vertical direction, each of the piezoelectric elements PZ vertically oscillates the corresponding one of the oscillation plates 87.

Each oscillation plate 87, which oscillates in a vertical direction, operates to eject the liquid crystal alignment film forming composition F from the corresponding nozzle N as a droplet Fb having a predetermined size. The droplet Fb then travels from the nozzle N in the direction opposed to direction Z and is received by the electrode forming surface 55*a* of the opposed substrate 55 that is moving immediately below the nozzle N.

In other words, as illustrated in FIG. 3, the ejection head 80 ejects the droplets Fb onto the opposed substrate 55 when the opposed substrate 55 moves immediately below the ejection head 80 along the main scanning direction.

After a first cycle of ejection, the liquid crystal alignment film forming composition F is ejected from the first and second nozzle rows 10, 11 onto predetermined positions at predetermined timings (a second cycle of ejection). In the second ejection cycle, referring to FIG. 3, corresponding coating dots are provided in such a manner as to partially overlap with the coating dots that have been formed in the first ejection cycle.

Subsequently, the liquid crystal alignment film forming composition F is ejected from the first and second nozzle rows 10, 11 onto predetermined positions at predetermined timings (a third cycle of ejection). In the third ejection cycle, referring to FIG. 3, corresponding coating dots are provided in such a manner as to partially overlap with the coating dots that have been formed in the second ejection cycle.

Further, by repeatedly ejecting the droplets Fb in the above-described manner in the fourth and subsequent cycles of ejection, overlapped portions of the coating dots are provided as illustrated in FIG. 3. In this manner, the liquid crystal alignment film forming composition F is efficiently applied onto the opposed substrate 55 in an optimal state, thus forming the liquid crystal alignment film 67 on the opposed substrate 55.

The above-described droplet ejection apparatus 70 has the following advantages.

The droplet ejection apparatus 70 reduces the area of the overlapped portions of the liquid crystal alignment film forming composition F. Therefore, a film with extremely small thickness is efficiently formed by the droplet ejection apparatus 70. The droplet ejection apparatus 70 is suitable particularly for forming the liquid crystal alignment film 67, which has extremely small thickness of 10 nm to 100 nm.

By reducing the area of the overlapped portions, the amount of the consumed liquid crystal alignment film forming composition F is saved. This reduces the cost.

In the main scanning direction and the sub-scanning direction, any one of the coating dots is formed with a relatively short delay from an adjacent one of the coating dots. This prevents drying marks from being formed in the boundary between each adjacent pair of the coating dots due to variation of the time spent for drying the coating dots. Therefore, the liquid crystal alignment film 67 is formed on the entire surface of the opposed substrate 55 in a uniform state without causing drying marks and lines. As a result, a liquid crystal display with high display quality can be provided.

Since the nozzles N are prevented from being clogged by the droplets Fb splashed from the adjacent ones of the nozzles N, maintenance of the droplet ejection apparatus 70 is facilitated.

As long as the droplet ejection apparatus of the present invention is an inkjet type ejection apparatus, the droplet ejection apparatus is not limited to a specific type. The droplet ejection apparatus may be, for example, a thermal type ejection apparatus that ejects droplets by generating bubbles through heating or a piezoelectric-type ejection apparatus that ejects droplets through compression using piezoelectric elements.

The invention claimed is:

1. A droplet ejection apparatus having a droplet ejection head having a nozzle forming surface in which a plurality of nozzles are formed, droplets of a functional film forming composition being ejected from the nozzles onto a substrate for forming a functional film on the substrate, wherein the nozzles form a plurality of nozzle rows that extend linearly, wherein the nozzles of each of the nozzle rows are spaced at substantially equal intervals in such a manner that the pitch between each adjacent pair of the nozzles becomes greater than the diameter of a coating dot formed by each of the droplets on the substrate and smaller than the double of the diameter of each coating dot, and wherein the nozzle rows are arranged in such a manner that the nozzles of the nozzle rows form a zigzag pattern.

2. The apparatus according to claim 1, wherein the pitch between each adjacent pair of the nozzle rows is greater than the diameter of each coating dot on the substrate and smaller than the double of the diameter of the coating dot.

3. The apparatus according to claim 1, wherein the apparatus is configured in such a manner that the droplets are ejected from the nozzles while the substrate or the droplet ejection head is moved in a direction perpendicular to the alignment direction of the nozzles of each nozzle row.

4. The apparatus according to claim 1, wherein the functional film has a thickness of 10 nm to 100 nm.

5. The apparatus according to claim 1, wherein the functional film forming composition is a solution having a surface tension of 30 mN/m to 45 mN/m.

6. The apparatus according to claim 1, wherein the functional film forming composition is a solution having a viscosity of 3 mPa·s to 20 mPa·s.

7. A method for forming a functional film, wherein the functional film is formed on a substrate by ejecting droplets of a functional film forming composition using the droplet ejection apparatus according to claim 1.

8. The method according to claim 7, wherein the droplets are ejected from the nozzles while the substrate or the droplet ejection head is moved in a direction perpendicular to the alignment direction of the nozzles of each nozzle row.

9. The method according to claim 8, wherein the droplets are ejected from the nozzles onto the substrate in such a manner that each adjacent pair of the coating dots in the movement direction of the substrate or the droplet ejection head are partially overlapped with each other.

10. The method according to claim 7, wherein the droplets are ejected onto the substrate in such a manner as to form the functional film having a thickness of 10 nm to 100 nm.

11. The method according to claim 7, wherein a solution having a surface tension of 30 mN/m to 45 mN/m is used as the functional film forming composition.

12. The method according to claim 7, wherein a solution having a viscosity of 3 mPa·s to 20 mPa·s is employed as the functional film forming composition.

13. A liquid crystal alignment film forming apparatus having a droplet ejection head having a nozzle forming surface in which a plurality of nozzles are formed, droplets of a liquid crystal alignment film forming composition being ejected from the nozzles onto a substrate for forming a liquid crystal alignment film on the substrate, wherein the nozzles form a plurality of nozzle rows that extend linearly, wherein the nozzles of each of the nozzle rows are spaced at substantially equal intervals in such a manner that the pitch between each adjacent pair of the nozzles becomes greater than the diameter of a coating dot formed by each of the droplets on the substrate and smaller than the double of the diameter of each coating dot, and wherein the nozzle rows are arranged in such a manner that the nozzles of the nozzle rows form a zigzag pattern.

14. The apparatus according to claim 13, wherein the pitch between each adjacent pair of the nozzle rows is greater than the diameter of each coating dot on the substrate and smaller than the double of the diameter of the coating dot.

15. The apparatus according to claim 13, wherein the apparatus is configured in such a manner that the droplets are ejected from the nozzles while the substrate or the droplet ejection head is moved in a direction perpendicular to the alignment direction of the nozzles of each nozzle row.

16. A method for forming a liquid crystal alignment film of a liquid crystal display having a substrate including the liquid crystal alignment film, wherein the liquid crystal alignment film is formed on the substrate by ejecting droplets of a liquid crystal alignment film forming composition using the liquid crystal alignment film forming apparatus according to claim 13.

17. The method according to claim 16, wherein the droplets are ejected from the nozzles while the substrate or the droplet ejection head is moved in a direction perpendicular to the alignment direction of the nozzles of each nozzle row.

18. The method according to claim 17, wherein the droplets are ejected from the nozzles onto the substrate in such a manner that each adjacent pair of the coating dots in the movement direction of the substrate or the droplet ejection head are partially overlapped with each other.

19. A liquid crystal display comprising:

an opposed substrate having a liquid crystal alignment film;

an element substrate having a liquid crystal alignment film; and a seal material that bonds the opposed substrate and the element substrate together, a liquid crystal being sealed in a space defined by the seal material, wherein the liquid crystal alignment film is formed on the opposed substrate or the element substrate using the liquid crystal alignment film forming apparatus according to claim 13.

* * * * *